US007985467B1

(12) United States Patent
Shu et al.

(10) Patent No.: US 7,985,467 B1
(45) Date of Patent: Jul. 26, 2011

(54) RADIATION-TRANSPARENT WINDOWS, METHOD FOR IMAGING FLUID TRANSFERS

(75) Inventors: Deming Shu, Darien, IL (US); Jin Wang, Burr Ridge, IL (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 1098 days.

(21) Appl. No.: 11/752,504

(22) Filed: May 23, 2007

(51) Int. Cl.
*B32B 7/02* (2006.01)

(52) U.S. Cl. ...................... 428/212; 428/220; 428/411.1

(58) Field of Classification Search .................. 428/212, 428/220, 411.1
See application file for complete search history.

(56) References Cited

U.S. PATENT DOCUMENTS

| | | | |
|---|---|---|---|
| 4,933,557 | A | 6/1990 | Perkins et al. |
| 5,585,644 | A | 12/1996 | Van Der Borst |
| 6,233,306 | B1 | 5/2001 | Van Sprang |

*Primary Examiner* — David Sample
*Assistant Examiner* — Lawrence Ferguson
(74) *Attorney, Agent, or Firm* — Joy Alwan; Brian J. Lally; John T. Lucas

(57) ABSTRACT

A thin, x-ray-transparent window system for environmental chambers involving pneumatic pressures above 40 bar is presented. The window allows for x-ray access to such phenomena as fuel sprays injected into a pressurized chamber that mimics realistic internal combustion engine cylinder operating conditions.

6 Claims, 5 Drawing Sheets

RADIATION-TRANSPARENT WINDOWS, METHOD FOR IMAGING FLUID TRANSFERS

CONTRACTUAL ORIGIN OF THE INVENTION

The U.S. Government has rights in this invention pursuant to Contract No. W-31-109-ENG-38 between the U.S. Department of Energy and the University of Chicago and/lor pursuant to Contract No. DE-AC02-06CH11357 between the United States Goverment and UChicago Argonne, LLC representing Argonne National Laboratory.

BACKGROUND OF THE INVENTION

1. Field of the Invention

This invention relates to the field of thin windows for high pressure enclosures and, more particularly, this invention relates to windows for high pressure enclosures that are transparent to x-ray radiation.

2. Background of the Invention

Detailed spray analysis is important to the overall aim of increasing combustion efficiency and reducing emissions of pollutants. An understanding of the liquid breakup mechanism close to the nozzle has significant bearing on the design of nozzle geometry and is key to realistic computer modeling. The subject of the experiments can be fast, transient phenomena including but not limited to supercritical fluid, high-pressure liquid, and gas injection, and plasma-material interactions, such as the fuel spray injected into a pressurized chamber that mimics realistic internal combustion engine cylinder operating conditions. These analysis must be run in a high pressure environment so as to mimic that of fuel injection systems.

Such high pressure enclosures contain windows for optical scrutiny of fluid flows occurring within the enclosures. Such windows have been in increasing demand, not only for fuel injection scenarios, but also for real-time studies of a variety of chemical reactions and other phenomena.

The materials involved in some phenomena under observation are often opaque to visible light due to highly dense droplets surrounding the core region of the events. Although significant advances in laser diagnostics have been made over the last 20 years, the region close to the nozzle has remained impenetrable due to opacity of the fuel.

With the advent of high intensity x-ray and other radiation sources, emerging radiation-imaging techniques are increasingly used to acquire ultra-fast two-dimensional (2D) radiation images of extended size and with high spatial resolution.

On the other hand, X-ray images yield quantitative information and yet are non-intrusive. By utilizing monochromatic x-radiography one can probe the characteristics of a myriad of events. In order to make these experiments possible in a variety of settings there is a need in the art for critical sample environmental chambers that are accessible to x-rays and other radiation for quantitative and time-resolved analysis.

However, view finders for use with these high pressure environments which provide near transparent scrutiny of x-ray interaction remain elusive. The attenuation of x-rays in a material is a steeply increasing function of the atomic number of the material, so that only low atomic number materials are suitable constituents for x-ray transparent windows. Beryllium is the commonly used material for x-ray-transparent windows. However, the health-hazardous nature of this brittle metal prohibits it from being a proper material for a window for a pneumatically pressurized enclosure because any breakage results in the wide dispersal of toxic materials. Beryllium is likely to break because its stiffness tends to cause fractures if the material is under tension. The same is true for other light-element (low atomic number) materials, such as diamond. Yet the development of practical radiation-transparent windows for high-pressure chambers has been an intensive area of research emphasizing the search for new types of materials that meet the rigorous requirements imposed by high-pressure conditions.

Thin x-ray transparent polymer windows have been used for enclosures where the pressure difference across the window did not exceed approximately one atmosphere. Such windows are disclosed in U.S. Pat. Nos. 4,933,557 (1990, to Perkins et al), 5,585,644 (1996, to Van der Borst) and 6,233,306 (2001, Van Sprang).

A need exists in the art for light-element windows with tensile strength higher than 200 MPa (one atmosphere=0.1 Ma) that can withstand high pressures (Many Aluminum alloys have tensile strength in the 124-200 MPa range. Moreover, Aluminum has too high X-ray absorption). The windows should be radiation-transparent. Furthermore, the windows should not comprise hazardous materials in the event breakage occurs.

SUMMARY OF THE INVENTION

An object of this invention is to provide a thin light-element window for high-pressure enclosures that overcomes many of the disadvantages in the prior art.

Another object of this invention is to provide a thin window for high-pressure enclosures that is substantially transparent to x-rays in the 2 to 200 keV range. A feature of this invention is the use of a polymer comprising only low atomic number (i.e., at or below atomic number 8) elements. An advantage of this invention is that there is minimal attenuation of x-rays in windows capable of withstanding high pressures.

Yet another object of this invention is to provide a light-element window for high-pressure enclosures with high tensile strength. A feature of this invention is the use of a polymer that hardens when extended beyond its yield point, the stress beyond which a material deforms by a relatively large amount for a small increase in the stretching force—beyond the yield point the material no longer obeys Hooke's law. An advantage of this invention is that it allows safe operation at pressures higher than one atmosphere. Another advantage of this invention is that it provides a window that retains its configuration through repeated alternations of high and low pressures.

In brief, this invention provides an x-ray transparent polymer window for high-pressure enclosures with high tensile strength that retains its configuration through repeated alternations of high and low pressures. Specifically, a polymer window is provided with a thickness of 5 microns or more capable of withstanding a pressure difference across the window of more than 2 atmospheres and a force of 15 Newtons per micron of thickness.

Also provided is a method for manufacturing an x-ray transparent polymer window for high-pressure enclosures with high tensile strength that retains its configuration through repeated alternations of high and low pressures.

The invention further provides a method for imaging opaque fluid phenomena comprising establishing a high pressure atmosphere in an enclosure; injecting the fluid into said atmosphere; and observing the injection of the fluid through a polymer window.

BRIEF DESCRIPTION OF THE DRAWING

The foregoing and other objects, aspects and advantages of this invention will be better understood from the following detailed description of the preferred embodiments of the invention with reference to the drawing, in which.

DETAILED DESCRIPTION OF THE INVENTION

Figure 1:
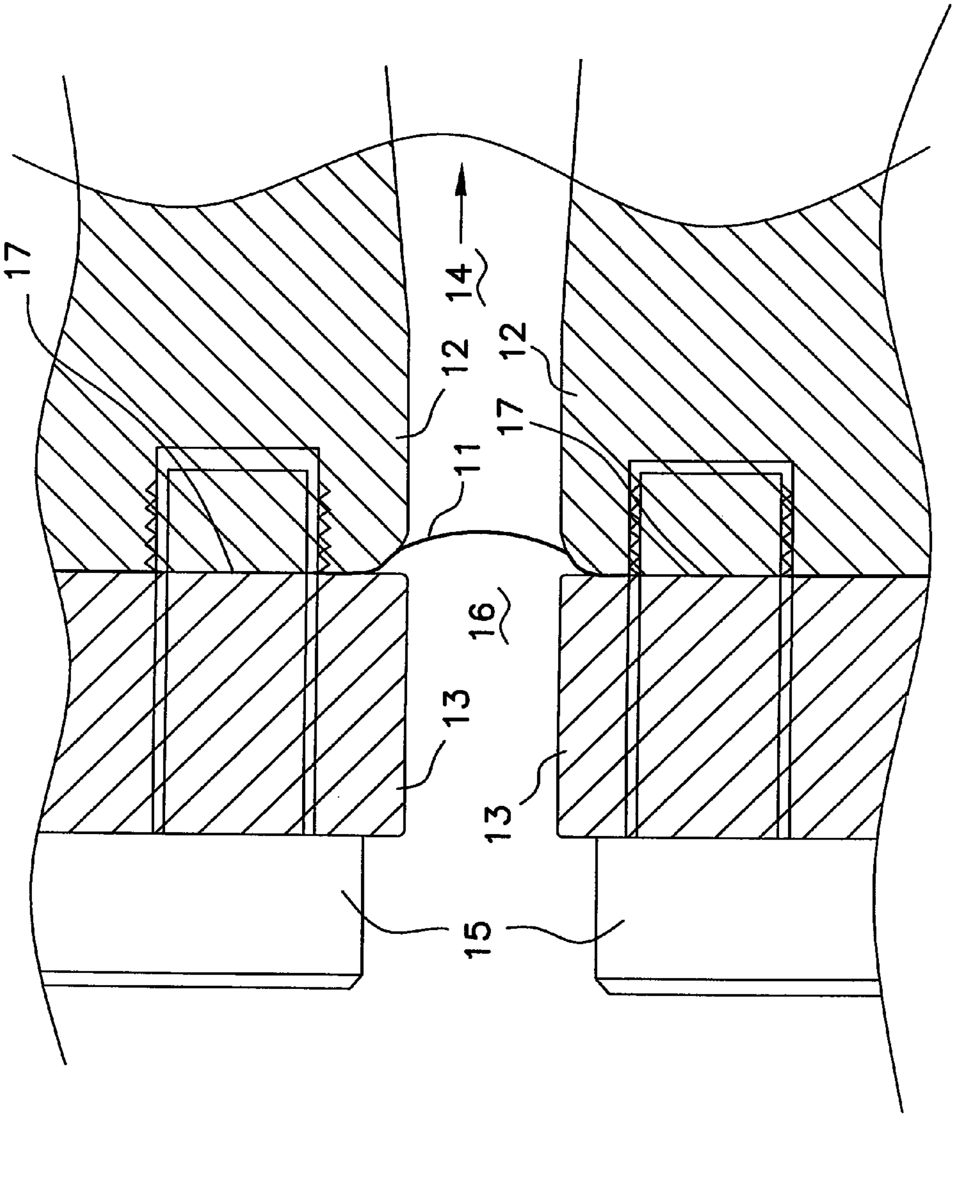
FIG. 1 is a schematic cross-section view of an x-ray-transparent window assembly, in accordance with features of the present invention.

Better understanding and control of highly transient phenomena, such as fuel sprays, supercritical fluids, plasmas and shock-associated processes would impact a broad scientific and technological community. The windows disclosed herein allow more realistic pressure conditions for those studies that have been difficult, if not impossible, to perform with x-ray radiography.

The invented window assembly finds application not only in synchrotron x-ray-based sample-holding devices but also in other x-ray testing instrumentation suitable to in-house or table-top sources. For example, the window can be used for sample containers in powder-diffraction measurements under non-ambient pressure and temperature conditions.

The present invention discloses a novel design for thin (between 0.003 mm-0.3 mm, and preferably between 0.05 mm and 0.1 mm thickness) radiation-transparent windows for imaging applications using a pneumatically pressurized enclosure. A series of bench tests have revealed that polymer-based thin films are able to provide the pressure and temperature resistance required by the proposed chambers. More importantly, polymer films allow much safer operation than the beryllium-based windows used previously.

A typical embodiment of the present invention is a 0.05 mm thick polymer window capable of withstanding a force of 750 Newtons (N). The maximum force increases with the thickness of the material. Thus the invented windows are capable of withstanding a force of 15 N per micron of thickness. The maximum pressure across the window decreases with the area of the window.

Invented windows 3 mm wide, 22 mm long, and 50 microns thick have been used for fuel spray x-ray experiments involving pneumatic pressures up to 36 bar (1 bar=0.987 atmospheres). (Throughout this application, "pressure" denotes the pressure differential across the window.) The invented windows are ordinarily tested with hydraulic pressure up to seven times higher than their pneumatic operation pressure and experimental tests under hydraulic pressures exceeding 120 bar have been conducted successfully for the above 3 mm wide, 22 mm long, and 50 microns thick windows mentioned above.

Thus, this invention provides windows of similar dimensions suitable for safe operation at pressures as high as 40 bar. The invented windows can be used at pressures of 100 bar or more when occasional breakage can be tolerated (e.g. when the contained fluid is a non-toxic liquid and the volume is not very large).

Design of and X-Ray-Transparent High-Pressure Window System

With extensive simulations and testing, the inventors have found that the window design should utilize foils made of polymeric resin (such as polyimide $C_{22}H_{10}N_2O_5$). Such foils possess both the required radiation transparency and the safety properties that are required in a high-pressure chamber. Polyimide has approximately 0.3 percent radiation attenuation per micron of thickness for 6 keV X-rays so that a polyimide window 0.05 mm thick has 85 percent transmission for 6 keV X-rays. This compares to 98 percent for a Beryllium window of the same thickness. Thus polyimide windows are suitable to facilitate substantially transparent transmissions of X-rays at energy levels of between 2 and 200 keV.

As shown in FIG. 1, an embodiment of the present invention comprises a dome-shaped window and includes four major components: a Kaptonc polyimide dome foil 11; a window base 12; a sealing clamp 13, and an optional delay line 14. The foil 11 is held in place between the base 12 and the clamp 13 with bolts 15 traversing the foil through apertures previously made in the foil. The window base is made from stainless steel or another high tensile stress metal or alloy. The sealing clamp provides a vacuum-tight seal for the interface between the polyimide dome foil and the window base. The shape of the window edge on the window base is rounded off to approximately 1 mm radius in the usual manner so as to create a near pure tensile condition for the composite dome foil, Ultrahigh-vacuum-compatible knife-edge gaskets are available and can be used on the window base 12 and sealing clamp 13. These knife edges are available commercially through suppliers such as MDC Vacuum Products. The window base and delay line are mounted on the test tank 16 through stainless-steel bolts.

Figure 2A:
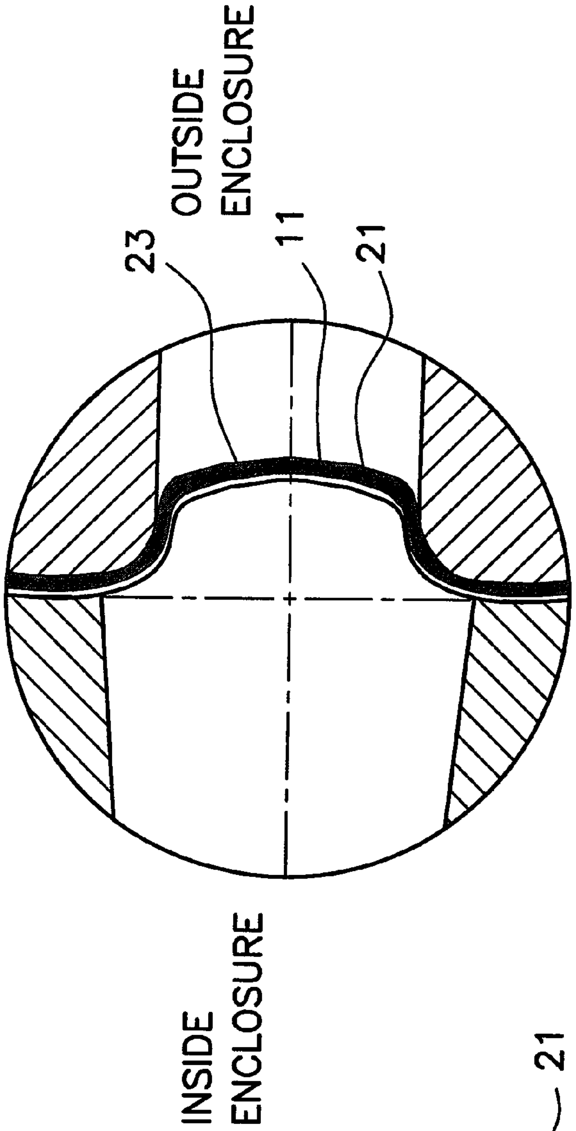
FIGS. 2A and 2B are schematic cross-sectional views of the structure of a composite x-ray-transparent window, in accordance with features of the present invention.
Figure 2B:
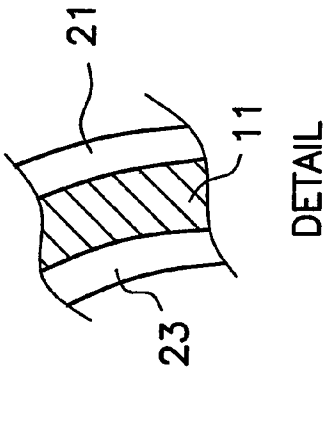

FIGS. 2A and 2B show the structure of a composite dome foil. The window foil is composed of three thin layers. The base layer 11 comprises pre-hardened polyimide and is positioned intermediate an infrared reflecting metal layer 23 and a graphite layer 21. An infrared reflecting metal layer 23 is coated on the surface of the base layer facing the inside of the high-pressure test tank. On the other side (i.e., the side of the base layer facing away from the inside of the tank) of the base layer 11, a graphite layer 21 is bonded to enhance cooling of the contents of the test tank. Based on various pressure and thermal conditions, the positions of the infrared reflecting layer and the graphite layer may be switched. Alternatively, these layers may be omitted altogether.

Polymer Window Detail

A typical window capable of withstanding a pressure of 100 bars is formed by a piece of 0.05 mm polyimide film clamped to a stainless-steel window frame with a 3 mm×22 mm rectangular aperture. Suitable polyimide foils are commercially available, for example as Kapton®, manufactured by DuPont Corporation, Circleville, Ohio. It is highly plastic, with a strain at failure of 0.72. Its properties are also temperature dependent.

A myriad of cross section foil geometries are suitable, including rectangular, square, oval, circular, or polygonal. However, a rectangular aperture with a length-to-width ratio of five or more is most suitable when the window is clamped between two metal plates without the use of an adhesive. Where the contained fluid is non-corrosive and non-solvent, an adhesive may be employed so as to form an aperture with a length to width ratio as low as one or even a circular aperture. Higher length-to-width ratios allow somewhat higher pressures. Thinner windows have also been used. For instance, a 16 mm×3 mm×0.025 mm polyimide window has been tested with 20 bar static pressure for 168 hours without damage.

The inventors have discovered that polyimides have the advantage that when the window is pressurized above its yield point, permanent deformation occurs across the surface of the film and the material is hardened in the process. Thus the window keeps its shape if pressure is repeatedly released and then increased again. This permanent shape resists pressure deformation and minimizes stress on the film.

In laboratory investigations, it was determined that polyimides exhibit a nonlinear stress/strain relationship, confirming the material property data supplied by the manufacturer. Significant plastic deformation develops in the film as the window is pressurized. This was not unexpected, as polyimide exhibits extremely robust physical properties, as shown in Table 1.

TABLE 1

| Polyimide Material Properties | |
|---|---|
| Tensile Elastic Modulus | 2.5 GPa |
| Poisson's Ratio | 0.34 |
| Yield Point (strain of 0.03) | 69 MPa |
| Ultimate Tensile Strength | 231 MPa |

Material property data from DuPont included plots of the Kaptona® nonlinear constitutive relationship for three different temperatures.

Figure 3:
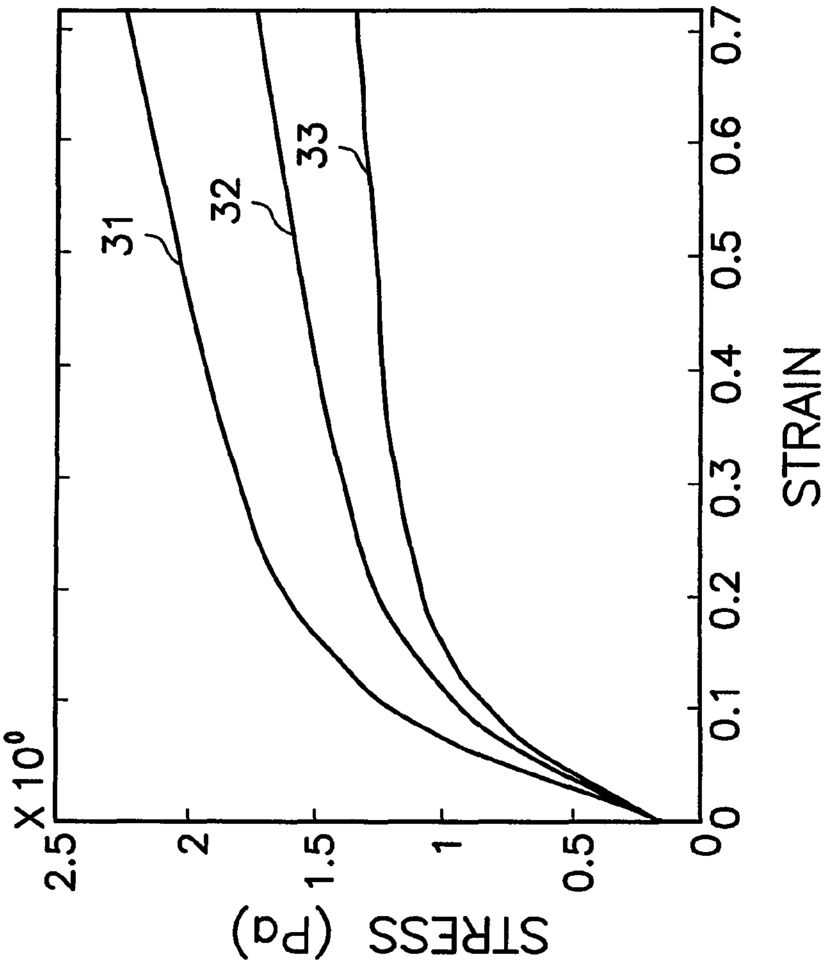
FIG. 3 presents curves representing the stress-strain constitutive relationship for polyimide windows, in accordance with features of the present invention.

FIG. 3 shows curves representing the stress-strain constitutive relationship for Kapton®; it is highly plastic, with a strain at failure (i.e., rupture) of 0.72, strain being defined as the fractional elongation compared to a sample's length when no stress is applied. The properties are also temperature dependent; properties for three temperatures 23 degrees Celsius (curve 31), 100 degrees Celsius (curve 32), 200 degrees Celsius (curve 33) are shown.

The experimental results compared well with measurements made on test articles, confirming the safety of the window design. Polyimide windows with dimensions of 3 mm×22 mm×0.05 mm thickness have been hydraulically tested with 37 bar static pressure without damage. After 2 weeks of 8 keV x-ray beam exposure with up to 10 bar pneumatic pressure at the Advanced Photon Source (APS) beamline, Argonne, Ill. four 3 mm×22 mm×0.05 mm thick polyimide windows were tested and survived with pneumatic pressure up to 75 bar.

A 0.05 mm Kapton® film can withstand temperatures of above 200 degrees Celsius. Also, a 0.05 mm Kapton® window is able to withstand sudden very localized pressure bursts during fuel injection measurements.

Delay Line Detail

Where the pressurized tank is in close proximity to a sensitive or expensive apparatus such as a X-ray detector or an accelerator with an evacuated beam chamber from which x-rays emanate through a thin window, a delay line is provided between the pressurized tank and the apparatus or accelerator window. The delay line delays and mitigates the shock wave resulting from breakage of the test tank window so as to minimize the probability of breakage of the accelerator window.

Figure 4:
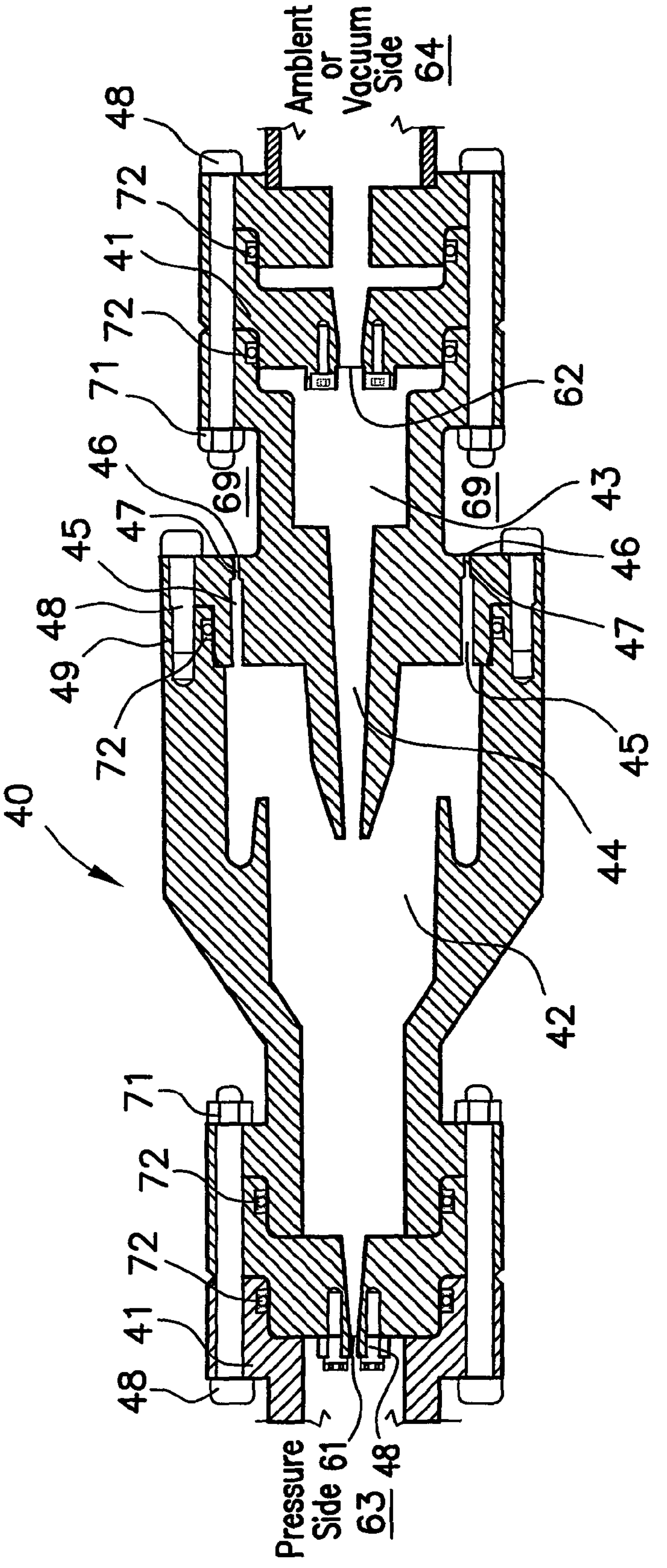
FIG. 4 is a schematic perspective view of an exemplary embodiment of a delay line in an experimental arrangement incorporating an x-ray-transparent window, in accordance with features of the present invention.

As shown in FIG. 4, the delay line designated generally as numeral 40 includes two sets of high-pressure x-ray window assemblies 41, each comprising a sealing clamp, a window foil, and a window base. A first window 61 connects to the high pressure enclosure 63, and a second window 62 coaxial with the first window 61 connects to the beam-chamber of the accelerator 64 where x-rays are produced. The delay line comprises two chambers, a first chamber 42 mounted to the first window 61 base followed by a second chamber 43. It must be appreciated that the first chamber 42 is so configured as to provide as much volume as possible for the shock wave to dissipate itself, while the second chamber 43 is so configured as to provide a straight through path 44 for an x-ray beam (or for visible light). The second chamber 43 allows only a small fraction of the shock wavefront to travel downstream. Thus the first chamber 42 is analogous to an electrical capacitance and the second chamber 43 to an electrical resistance.

A large number of emergency pressure release paths 45, positioned radially from the various chambers 42, 43, are sealed with pressure releasing foils 46 to provide egress to the outside 64 of the delay line assembly in instances of over pressurization.

In a preferred embodiment, the first and second chambers are of modular design, and colinearly positioned relative to each other. A multi-component delay line comprising a plurality of coaxial pairs of first and second chamber combinations is therefore produced. The windows, the window assemblies, and the first and second chambers are attached to each other by means of bolts 48 screwed into threaded bores 49 or into nuts 71. Pressure-tight seals are provided by means of gaskets or O-rings 72. The delay line can be evacuated by such means as a mechanical pump and then left evacuated or filled with Helium at atmospheric pressure in order to minimize x-ray attenuation.

Figure 5:
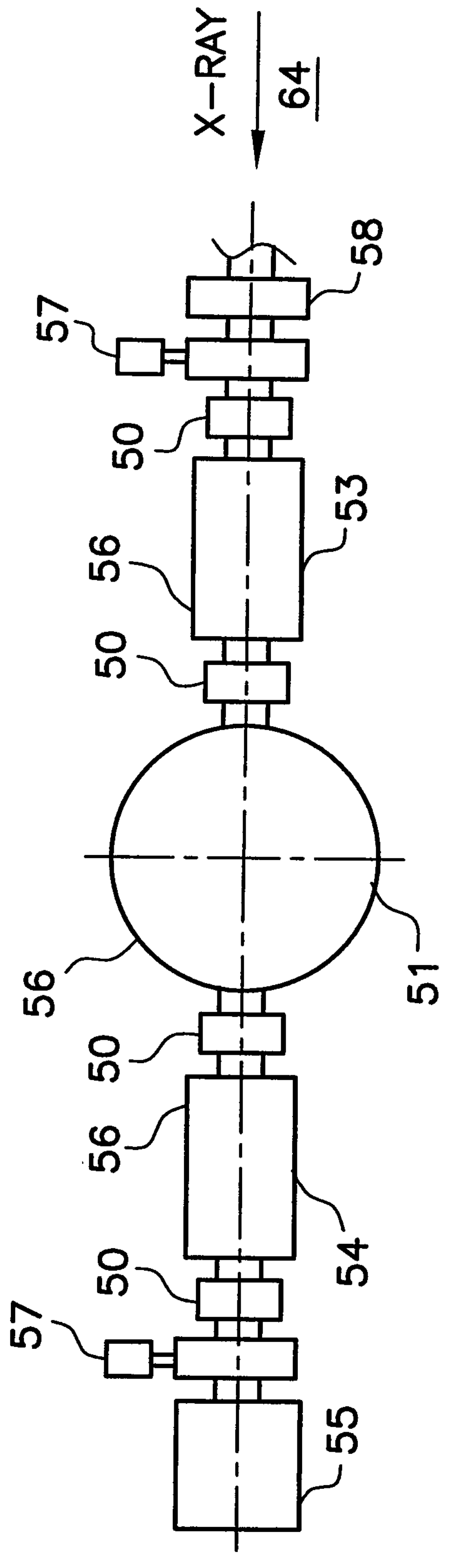
FIG. 5 is an overall schematic view of an exemplary experimental arrangement incorporating an x-ray-transparent window, in accordance with features of the present invention.

FIG. 5 is a schematic depiction of an integrated system utilizing the invention. Radiation such as an X-ray or gamma-ray beam enters from the right through a Beryllium window 58. (The source of the radiation can be an accelerator, not shown.) The radiation beam impinges on a test chamber 51 after traversing a delay line 53. Phenomena in the test chamber are observed with a x-ray detector 55 or other radiation recording means, separated from the test chamber 51 by another delay line 54.

Pressure sensors 56 are mounted on the delay lines and on the test chamber, if a test chamber window breaks, the resulting shock wave created in the test chamber 51 and in the abutting delay line is sensed by one or more pressure sensors 56. The sensors communicate this information to a system monitor which in turn causes fast valves 57 to close so as to prevent damage to the accelerator Beryllium window 58 or to the x-ray detector 55. Kapton® windows 50 seal the delay lines and the test chamber 51 so as to allow unimpeded passage to the x-rays.

Applications of Pressurized Windows

The invented window has been used to test gasoline and diesel fuel sprays under pressurized conditions. Fuel spray injected into an injection chamber filled with 10 to 37 bar of $N_2$ gas was imaged with x-rays through the x-ray-transparent windows. The structure of the sprays differs dramatically in an unexpected fashion under pressurized conditions. In one instance, the spray was performed with 1350 bar of injection pressure with a prototype diesel injector. The injection chamber was filled with $N_2$ gas of up to 37 bar of pressure.

While the invention has been described with reference to details of the illustrated embodiment, these details are not intended to limit the scope of the invention as defined in the appended claims.

The invention claimed is:

1. A radiation-transparent window comprised of synthetic polyimide layer interleaved between a thin graphite layer and a thin infrared-reflecting metal layer having a thickness of between 3 microns and 300 microns, capable of withstanding a force of 15 Newtons per micron of thickness without rupture.

2. The window as recited in claim 1 wherein the window is dome-shaped which is naturally formed and hardened by subjecting it to a pre-pressurized progression so that it is extended beyond its yield point.

3. The window as recited in claim 1 wherein the window has a permanent configuration that is not altered by repeated alternations between a pressure resulting from a force of 30 Newton per micron of thickness and a pressure resulting from a force of 2 Newton per micron of thickness.

4. The window as recited in claim 1 with approximately a 0.3 percent attenuation per micron of thickness for 6 keV X-rays.

5. The window as recited in claim 1 wherein said window defines a length dimension and a width dimension and wherein the length dimension is less than five times the width dimension when a force of 15 Newtons per micron of thickness is applied on the window without rupture.

6. The window as recited in claim 1 wherein said window can withstand temperatures of 200 degrees Celsius under a 7 Newtons per micron of thickness force for a period of three days.

* * * * *